UNITED STATES PATENT OFFICE.

WILHELM SCHUMACHER, OF OSNABRÜCK, GERMANY, ASSIGNOR TO GENERAL BRIQUETTING CO., OF NEW YORK, N. Y., A CORPORATION OF MAINE.

METHOD OF FORMING AGGLOMERATED BODIES FROM ORES.

1,121,048.  Specification of Letters Patent.  Patented Dec. 15, 1914.

No Drawing.  Application filed April 30, 1912. Serial No. 654,223.

*To all whom it may concern:*

Be it known that I, WILHELM SCHUMACHER, a subject of the Emperor of Germany, and resident of Osnabrück, in the Kingdom of Prussia and Empire of Germany, have invented certain new and useful Improvements in the Method of Forming Agglomerated Bodies from Ores, of which the following is a specification.

My invention relates more particularly to the manufacture of briquets from fine ores. The use of such ores, when subjected to treatment in the usual manner in the blast furnace, entails a considerable loss, such loss being partially represented in what is called flue dust.

For many years the problem of agglomerating flue dust and making it fit for use in a blast furnace has occupied manufacturers and inventors. Some adopted schemes known as nodulizing, others employed electric agglomerating processes, but I reached a satisfactory solution of the problem by discovering that under certain conditions flue dust could be formed into relatively permanent briquets. I discovered that flue dust, if compressed into briquets in the presence of a catalyzing agent such as chlorid of lime or an equivalent thereof—in fact, with flue dust from certain ores, great pressure in itself acts as a catalyzing means—that the individual particles of flue dust would become firmly united so that the briquet could be placed in the blast furnace and its iron contents recovered. For the broad idea underlying this process, I obtained Letters Patent No. 933,270.

Upon further study and investigation of what actually takes place when flue dust briquets are formed according to my process, I discovered that one of the main effects of the catalytic process is to introduce into the composition of the flue dust additional molecules of oxygen. The action may be described as one which transforms the lower order of oxids or oxidules of the flue dust into a higher order of oxids. When this condition of higher order of oxids has been created, the particles of flue dust will readily unite into a more or less solid coherent structure. The briqueting is also aided by the fact that flue dust contains more or less lime or silicates of lime which has cementing qualities. The catalyzing agent itself plays no direct observable part in the chemical transformation which takes place in the flue dust, but it merely serves to evoke or bring about conditions where the flue dust will of its own constitution be brought to a condition where suitable briqueting is possible. I have also found that the fine iron ore used in the blast furnace contains, as ore, the higher order of oxids whereas the flue dust contains the lower order of oxids. The ore particles which are by reason of the conditions in the furnace transformed into the lower order of oxids are ejected by the air blast in the form of flue dust. The fine ore particles will not by themselves react readily with the catalyzing agent to form relatively permanent briquets but the flue dust will, and this seems to be due to the difference in the initial oxygen conditions of the two bodies. Based upon these discoveries and observations I have been led to the conclusion that the production of flue dust in the relatively large quantities in which it is now created is an uneconomical thing, for the iron ore is first placed in the blast furnace, the flue dust is created out of the iron ore and is then converted into briquets which are again placed in the same blast furnace so that the same ore must go through the blast furnace twice. I reasoned, therefore, that if in some way I could so prepare the ore that it would be converted into iron, the very first time it was brought into the furnace, I would obviate a series of unnecessary operations and create a more economical process.

In the light of the facts which I have outlined above I have discovered that if I reduce the ore before bringing it into the blast furnace, *i. e.* if I bring it from the condition in which it contains the higher order of oxids to a condition in which it contains only the lower order of oxids or oxidules, I will then have the ore in a condition in which it can be briqueted in connection with the catalytic process aforesaid. This brings it into a condition in which it is fit for briqueting according to my process as described for flue dust, by the employment of which it will become an ore body that can be treated in a blast furnace. In order to effect this reduction of the ore, I may proceed as follows: I mix a quantity of fines, or fine ore,—that being the material to which the present invention is peculiarly adapted,—with coal dust and heat the mass for one or two hours up to about 500° or 600° C. or I bring it to a temperature of 400° or 500° or introducing gases containing CO through the ore. In the first case the oxygen is driven off and in the second case CO becomes converted into $CO_2$, thus reducing the amount of oxygen components of the ore. Although not necessary, lime may be added to assist in the creation of silicates which, as already stated, appear in the flue dust and which have a certain cementing value. The reduced ore, which is ore in its natural condition except for such reduction, as contradistinguished from flue dust, which is ore that has passed through a blast furnace, is then subjected to the catalytic process which consists in the addition of a large quantity of water and an appropriate quantity of the catalytic substance in solution such as, for example, magnesium sulfate; briquets are then formed by placing quantities of this material in a press and the briquets, when finished, will be suitable for use in a blast furnace. If a press is used which is capable of very great pressures, the pressure itself will operate as a catalytic agent and it will not be necessary to add to the reduced ore any additional agent, the pressure operating as such agent.

The reducing process may be carried out in any rotary calcining furnace, of which there are quite a number in existence, so that my process does not require any special apparatus.

The essence of this invention consequently resides in the employment of a specially prepared starting material, that is, a reduced fine ore, as the basis for the formation of the briquets according to the catalytic process.

Having now described my invention, what I claim is:

1. The process of preparing fine ore of the hematite or limonite group for use in a blast furnace, which consists in briqueting, in the presence of a suitable catalytic agent, ore which is in all respects a natural ore except that it has been reduced from its natural condition of high oxidation to a lower state of oxidation, while preventing the formation of metallic iron, whereby the reduced ore is oxidized to a higher state of oxidation and the briquet particles are caused to cohere firmly as the result of the change from the lower to the higher oxid condition of the iron ore.

2. The process of preparing fine ore of the hematite or limonite group for use in a blast furnace, which consists in briqueting in the presence of a suitable catalytic agent, ore which is in all respects a natural ore except that it has been reduced in the presence of lime from its natural condition of high oxidation to a lower state of oxidation, while preventing the formation of metallic iron, whereby the reduced ore is oxidized to a higher state of oxidation and the briquet particles are caused to cohere firmly as the result of the change from the lower to the higher oxid condition of the iron ore.

In testimony whereof I have hereunto set my hand in the presence of two subscribing witnesses.

WILHELM SCHUMACHER.

Witnesses:
LOUIS ALEXANDER,
JOHN A. KEHLENBECK.